(12) United States Patent
Bock

(10) Patent No.: US 7,883,055 B2
(45) Date of Patent: Feb. 8, 2011

(54) PIVOTING BAGGAGE RACK INTENDED FOR AN AIRCRAFT CABIN

(75) Inventor: Thomas-Mathias Bock, Grenade-sur-Garonne (FR)

(73) Assignee: Airbus, Blagnac (FR)

( * ) Notice: Subject to any disclaimer, the term of this patent is extended or adjusted under 35 U.S.C. 154(b) by 471 days.

(21) Appl. No.: 11/589,203

(22) Filed: Oct. 30, 2006

(65) Prior Publication Data

US 2007/0095980 A1  May 3, 2007

Related U.S. Application Data

(60) Provisional application No. 60/750,034, filed on Dec. 14, 2005.

(30) Foreign Application Priority Data

Oct. 28, 2005 (FR) .................................. 05 11028

(51) Int. Cl.
*B64D 11/00* (2006.01)
(52) U.S. Cl. .................................. 244/118.5
(58) Field of Classification Search ............. 244/118.1, 244/118.5, 137.2; 220/810, 811, 812, 825, 220/830, 835
See application file for complete search history.

(56) References Cited

U.S. PATENT DOCUMENTS

| | | | |
|---|---|---|---|
| 5,395,074 A | 3/1995 | Hart et al. | |
| 5,456,529 A | 10/1995 | Cheung | |
| 5,480,109 A * | 1/1996 | Klein et al. | 244/129.5 |
| 5,868,353 A | 2/1999 | Benard | |
| 6,241,186 B1 * | 6/2001 | Calnon | 244/118.5 |
| 6,273,365 B1 * | 8/2001 | Hiesener et al. | 244/118.1 |
| 6,527,325 B2 * | 3/2003 | Steingrebe et al. | 296/37.7 |
| 6,547,184 B2 * | 4/2003 | Nieberle | 244/119 |
| 7,234,666 B2 * | 6/2007 | Novak et al. | 244/118.5 |
| 2001/0011692 A1 | 8/2001 | Sprenger et al. | |
| 2002/0101090 A1 | 8/2002 | Steingrebe et al. | |
| 2004/0245897 A1 * | 12/2004 | Stephan et al. | 312/246 |
| 2005/0064174 A1 * | 3/2005 | Gideon et al. | 428/317.9 |

FOREIGN PATENT DOCUMENTS

| | | |
|---|---|---|
| AT | 410536 | 5/2003 |
| DE | 44 25 869 | 2/1996 |
| EP | 0 614 806 | 9/1994 |

OTHER PUBLICATIONS

U.S. Appl. No. 12/374,756, filed Jan. 22, 2009, Bock.

* cited by examiner

*Primary Examiner*—Tien Dinh
*Assistant Examiner*—Michael Kreiner
(74) *Attorney, Agent, or Firm*—Oblon, Spivak, McClelland, Maier & Neustadt, L.L.P.

(57) ABSTRACT

A baggage rack includes a compartment having a lower outer face, an upper face, an open face allowing access to the compartment, as well as a back. The rack is mounted pivoting around an axis of pivoting between an open position in which the open face of the compartment is accessible and in which a rear portion of the lower outer face is concealed, and a closed position in which the open face of the compartment is retracted and in which the rear portion of the lower outer face is visible. The rear portion has a cylindrical form including generatrices substantially parallel to the axis of pivoting of the rack, and the distance from the axis of pivoting to the generatrices is increasing from the back of the compartment toward the open face of the latter.

18 Claims, 1 Drawing Sheet

PIVOTING BAGGAGE RACK INTENDED FOR AN AIRCRAFT CABIN

CROSS-REFERENCE TO RELATED APPLICATIONS

This document claims priority to French Application Number 05 11028, filed Oct. 28, 2005 and U.S. Provisional Application No. 60/750,034, filed Dec. 14, 2005, the entire contents of which are hereby incorporated by reference.

BACKGROUND OF THE INVENTION

1. Field of the Invention

This invention relates to a baggage rack intended for an aircraft cabin.

The field of this invention is the transport of passengers in an aircraft. During a trip, the travelers' baggage is placed in the holds of the aircraft, while lighter baggage can accompany the travelers in the aircraft cabin. In this cabin, storage spaces are provided for this baggage, also referred to as hand baggage. More often than not, these storage spaces are arranged in the upper portion of the aircraft cabin, beneath the ceiling of this cabin and above the seats intended to accommodate the passengers.

2. Description of the Related Art

There are two major types of storage space for baggage such as described previously. On the one hand there are baggage bins and on the other hand baggage racks. A baggage bin is a compartment fixed in relation to the aircraft cabin, and a door, generally pivoting, allows the opening and closing of access to the baggage compartment. A baggage rack, for its part, also has a compartment intended to accommodate baggage and comprising an access. Here this compartment is a compartment movable between a first extended position in which access to the compartment is open, allowing the insertion and removal of baggage, and a position retracted inside the ceiling of the aircraft cabin, in which access to the compartment is closed.

The current trend, dictated by the airline companies, is to increase the volume of storage space for hand baggage inside aircraft cabins. However, the volume inside an aircraft cabin is limited. It therefore is advisable to make the most of the available space inside a given cabin. Moreover, as regards the baggage racks and bins, their dimensions are limited inasmuch as the standards provide that these storage spaces, in open or closed position, must not hinder the movement of passengers in the aisles of the aircraft cabin.

SUMMARY OF THE INVENTION

This invention then has as a purpose to provide a baggage rack that, for a given length (measured longitudinally in the aircraft cabin), makes possible a greater volume of storage space for baggage than the known racks of the prior art.

To this end, it proposes a rack for baggage, intended in particular for an aircraft cabin, comprising a compartment having a lower outer face, an upper face, an open face, arranged between the lower outer face and the upper face, and allowing access to the compartment for the depositing and removal of baggage or similar items inside same, as well as a back, opposite the open face of the compartment, this rack being mounted pivoting around an axis of pivoting and being movable around this axis between an open position in which the open face of the compartment is accessible from the cabin and in which a rear portion of the lower outer face is concealed, and a closed position in which the open face of the compartment is retracted and in which the rear portion of the lower outer face is visible.

According to the invention, the rear portion, concealed when the rack is open, has a cylindrical form comprising generatrices more or less parallel to the axis of pivoting of the rack, and the distance from the axis of pivoting to the generatrices is increasing from the back of the compartment toward the open face of the latter.

By cylindrical surface there is to be understood here a surface that can be generated by the movement of a straight line always retaining the same orientation. Such a surface therefore is the juxtaposition of parallel lines, referred to as generatrices, and arranged one next to the other.

A rack according to the invention therefore does not have circular cylindrical form near the back thereof, but a form reminiscent of a spiral. This new form makes it possible to enlarge the interior volume of the baggage rack without having to encroach on the space set aside for the movement of passengers in the aircraft cabin.

In a rack for baggage according to the invention, an appreciable gain in volume is obtained when the distance from the axis of pivoting to the generatrices varies from one end to the other of the rear portion by a value ranging from 5 to 20 cm, preferably from 10 to 15 cm.

For the interior layout of a rack for baggage according to the invention, the compartment advantageously comprises a lower inner face forming a floor in this compartment; the lower inner face of the compartment is more or less plane on the side of the open face; the lower inner face of the compartment rises up near the back, and a groove, the concavity of which is positioned toward the upper face of the compartment, is implemented in the joining zone between the raised portion of the lower face and the back. This interior layout of the baggage rack makes it possible in particular to accommodate a suitcase not down flat on the lower inner face of the compartment intended to accommodate baggage, but diagonally in this compartment. In such a rack, for a better retention of a suitcase, or of another piece of baggage, it can be provided that the free edge of the lower inner face of the compartment situated on the side of the open face for access to the compartment has a rim projecting from the lower inner face of the compartment toward the upper face of the latter.

This invention also relates to an aircraft cabin, characterized in that it comprises at least one rack for baggage such as described above.

In such an aircraft cabin, an air vent extending along the rear portion of the lower outer face of a baggage rack can be provided, and this air vent has a movable flap at its outlet, for example. In this way, the outlet surface of the air vent can remain constant by subjugating the position of the flap to that of the baggage rack. In an advantageous embodiment, for it is quite simple to implement, the movable flap has a pivoting strip, extending under the joining between the rear portion of the lower outer face and the back of the compartment, when the rack is closed, and the pivoting strip is mounted, for example, pivoting around a longitudinal axis more or less parallel to the axis of pivoting of the corresponding baggage rack A movable flap such as described above can have spacing shims on the side of the baggage rack, and prestressing means then can be provided in order to keep the spacing shims supported on the rear portion of the lower outer face of the baggage rack. It thus is possible, in simple manner, to ensure a constant air slit width. When the pivoting strip is mounted pivoting around a longitudinal axis more or less parallel to the axis of pivoting of the corresponding baggage rack, the prestressing means comprise, for example, a spring integrated into the axis of pivoting of the pivoting strip. For example, a spring can be provided at each level of the axis of pivoting of the pivoting strip.

This invention also relates to an aircraft, characterized in that it comprises a cabin such as described above.

BRIEF DESCRIPTION OF THE DRAWINGS

Details and advantages of this invention will emerge more clearly from the description that follows, presented with reference to the attached schematic drawings on which:

FIG. 1 is a schematic view of a rack according to the invention in closed position, while

DETAILED DESCRIPTION OF THE PREFERRED EMBODIMENTS

Figure 1:
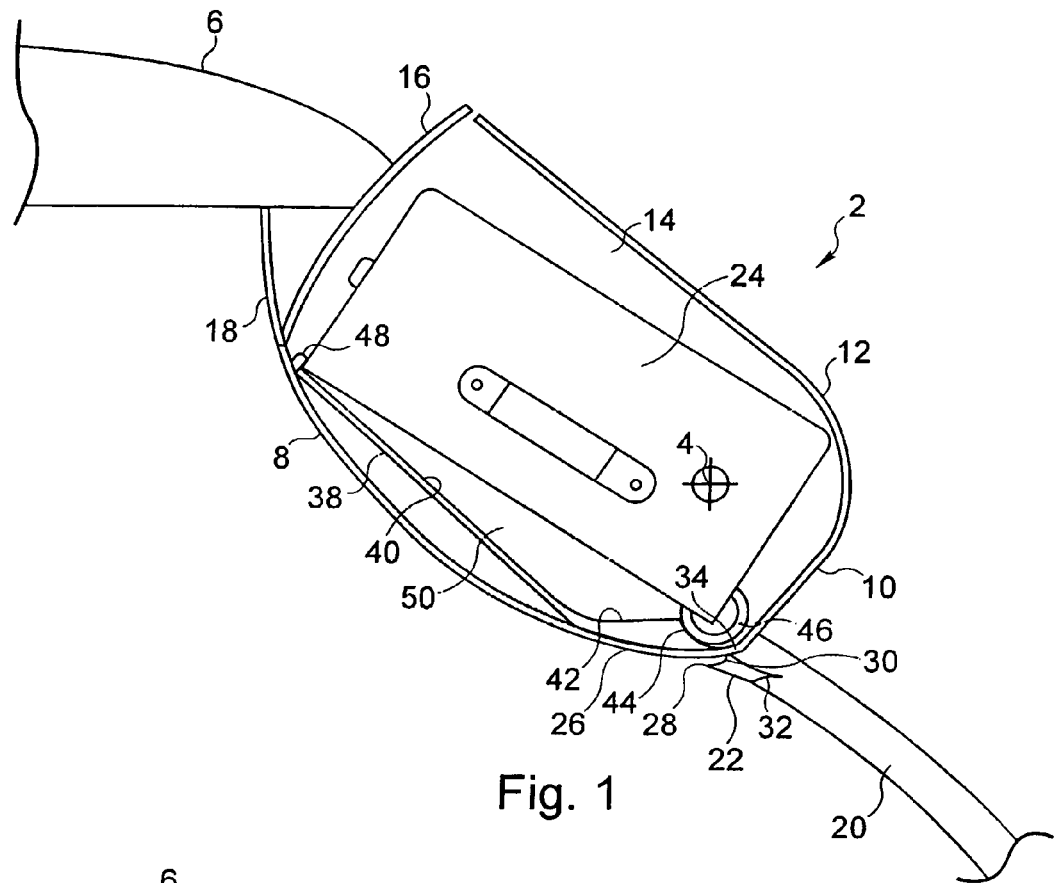

The baggage rack 2 depicted in the drawings is a rack mounted pivoting around an axis of pivoting 4. Here it is a matter of a baggage rack 2 mounted in an aircraft cabin. This rack is mounted in the upper portion of this cabin, above the passenger seats, not depicted. The axis of pivoting 4 is a longitudinal axis in relation to the aircraft cabin. The ceiling 6 of this cabin is recognizable on the drawings.

The baggage rack 2 comprises a lower outer face 8, a back 10, an upper face 12 and lateral walls 14. The overall shape of this rack is more or less parallelepipedal with a rounded lower face. The face opposite the back 10 is a completely open face.

On FIG. 1, the baggage rack 2 is depicted in its closed position. It then is retracted in the ceiling 6 of the aircraft cabin. Inside this ceiling, a fixed flap 16 comes to close the open face of the baggage rack, opposite the back 10. This fixed flap 16 takes on, for example, as depicted in the drawings, the form of a circular cylindrical section, the axis of which corresponds to the axis of pivoting 4.

For esthetic reasons, a streamlining 18 is provided at the connection between the ceiling and the baggage rack. In closed position of the latter, the streamlining completely conceals the fixed flap 16 from the sight of the passengers occupying the aircraft cabin. This streamlining 18, in the closed position of the baggage rack, extends the lower outer face 8 of this baggage rack 2 toward the ceiling.

Beneath the baggage rack 2, the outer lower face 8 is extended by a lateral wall 20 of the aircraft cabin. Usually, at the joining between the baggage rack and the lateral wall 20 of the cabin there is an air vent through which air generally is sent into the cabin. In this embodiment according to the invention, this air vent comprises a movable flap 22 at its outlet.

Figure 2:
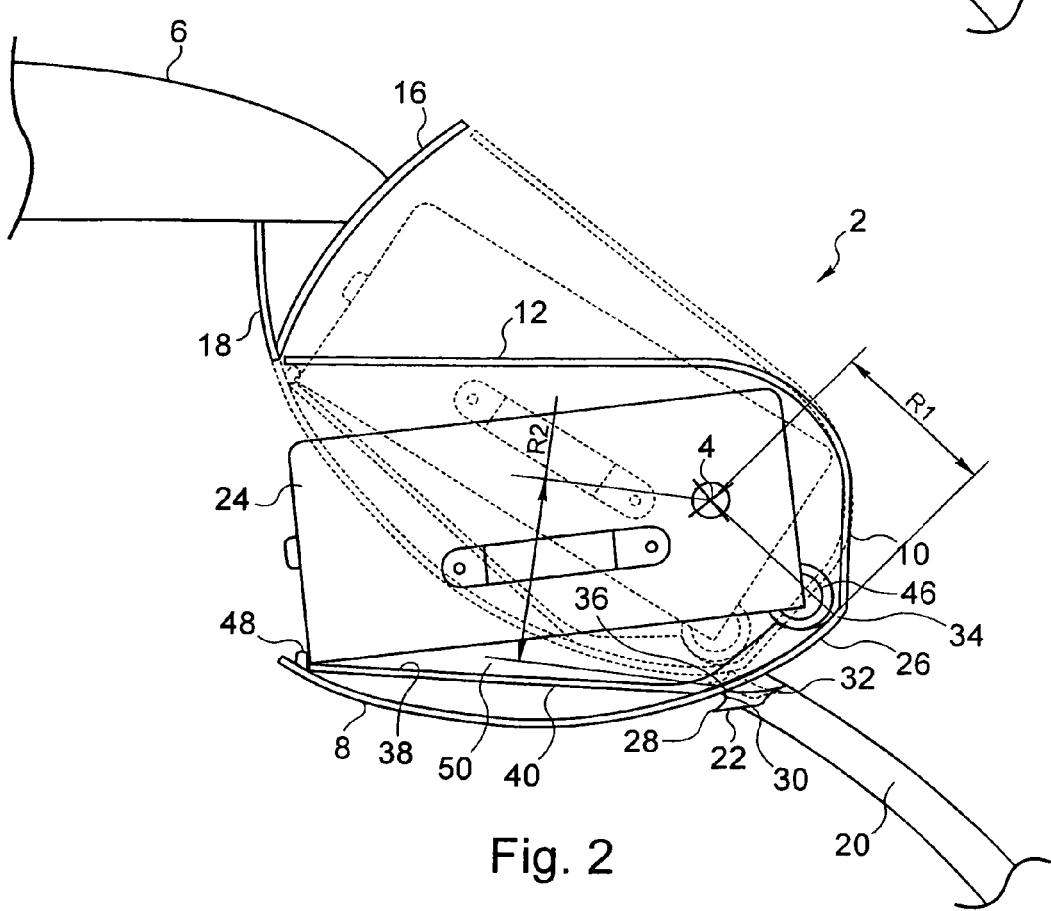
FIG. 2 shows this rack schematically in open position.

FIG. 2 depicts the baggage rack in its open position. In order to go from the closed position depicted on FIG. 1 to the open position of FIG. 2, the baggage rack 2 pivots downward around its axis of pivoting 4. In this position, the fixed flap 16 no longer covers the open face of the rack and this open face is completely clear. A passenger then can place a suitcase 24 inside the rack or remove it therefrom.

The lower outer face 8 of the baggage rack 2 has an area situated on the side of the back 10, referred to as rear portion 26, that is visible from the inside of the aircraft cabin when the baggage rack 2 is in its closed position (FIG. 1) and that is concealed by the movable flap 22 and the lateral wall 20 of the cabin when the baggage rack 2 is in its open position.

The rear portion 26 of the lower outer face 8 has a cylindrical form. Such a surface is a surface that can be generated by the movement of a straight line, also referred to as generatrice, always retaining the same direction. Such a surface therefore is a succession of straight lines, referred to as generatrices, all parallel to each other and arranged one next to the other. The rear portion 26 has the form of a cylindrical surface the generatrices of which are parallel to the axis of pivoting 4 and such that the distance from a generatrice to the axis of pivoting 4 is increasing from the back 10 of the baggage rack 2 toward the open front face of the latter.

When the baggage rack opens and closes, the movable flap 22 remains supported on the lower outer face 8 of the baggage rack. This movable flap 22 comprises a profiled strip 28 extending parallel to the axis of pivoting 4, as well as spacing shims 30 that make it possible to ensure retaining a constant air outlet slit width for the air vent, thus maintaining the same flow of air whether the baggage rack 2 is in open or closed (or intermediate) position.

The profiled strip 28 (and therefore also the movable flap 22) is mounted pivoting around a second axis of pivoting 32 parallel to the axis of pivoting 4 of the baggage rack 2. This second axis of pivoting 32 is borne by the lateral wall 20 of the aircraft cabin. It comprises prestressing means, not depicted, keeping the movable flap 22 always supported by way of spacing shims 30 on the rear portion 26 of the lower outer face 8 of the baggage rack 2. These prestressing means can comprise, for example, a spring associated with each level of the second axis of pivoting 32 so as to exert a return couple on the movable flap 22.

By way of example, there are considered on the one hand, a first generatrice 34 of the rear portion 26 corresponding to the generatrice on which the spacing shims 30 rest when the baggage rack 2 is in its open position, and on the other hand, a second generatrice 36 of the rear portion 26 corresponding to the generatrice on which the spacing shims 30 rest when the baggage rack is in its closed position. The first generatrice 34 is apart from the axis of pivoting 4 of the baggage rack 2 by a distance R1, while the second generatrice is apart from this axis of pivoting 4 by a distance R2. According to the invention, R2>R1. The value R2-R1 ranges, for example, between 5 and 20 cm, preferably between 10 and 15 cm.

With such a baggage rack, it is clearly evident that the volume of the baggage rack 2 is increased by maintaining the same depth, that is, the distance separating the back 10 from the open face of the baggage compartment.

In order to better take advantage of the increased inside volume of the baggage rack 2, a layout of the interior of the compartment accommodating a suitcase 24 is proposed.

A floor is arranged in the compartment intended to accommodate the baggage. This floor forms the lower inner face 38 of the baggage rack 2. This lower inner face 38 has a plane portion 40 on the side of the open face of the rack. This plane portion 40 extends, for example, over 60 to 85% of the surface of the lower inner face 38. In the embodiment depicted in the drawings, it extends over approximately 70% of the depth of the baggage rack. Then, on approaching the back 10 of the baggage rack 2, the lower inner face 38 has a raised portion 42 positioned toward the upper face 12. Thus, on the attached Figures corresponding more or less to a cross section, the lower inner face 38 of the baggage rack 2 has an angled form.

The free end of the raised portion 42 has a groove 44. The latter therefore is in the immediate vicinity of the back 10. This groove 44 is of circular cylindrical form. Its concavity is positioned toward the upper face 12 of the baggage rack 2. This groove 44 is of a size suitable for accommodating a wheel 46 of a suitcase 24. Thus the radius of curvature of the groove 28 is, for example, on the order of 3 to 10 cm.

At the present time, a very great majority of suitcases have wheels 46. The placement of a suitcase 24 with wheels 46 then is performed in the following manner. The baggage rack 2 is set in its open position depicted on FIG. 2. The suitcase 24 then is positioned so that these wheels 46 are introduced first inside the baggage rack 2 and come to roll over the plane portion 40 of the lower inner face 38 of the baggage rack 2. On approaching the back 10 of the baggage rack, the raised portion 46 of the lower inner face 38 guides the wheels 46 toward the groove 44. The suitcase 24 then is in place in the baggage rack 2. It is held in this rack thanks to the cooperation of the wheels 30 and the groove 28. For the comfort of the passenger, the raised portion 40 rises up gradually from the plane portion 40 to the groove 44, so that the suitcase 24 reaches the groove 44 smoothly and without jolts. This loading process is natural for the passenger who prefers to position the handle of his baggage (generally opposite the wheels thereof) on the accessible side of the rack.

Once in place in the respective compartment, the wheels 46 of the suitcase 24 are approximately 5 to 30 cm above the level of the plane portion 40 of the lower inner face 38. The suitcase 24 then is held in this rack thanks to the cooperation of the wheels 46 and the groove 44.

The plane portion 40 of the lower inner face 38 of the baggage rack 2 preferably is more or less horizontal when the baggage rack 2 is in its open position. The aircraft here is considered to be down on the ground. In this case, the floor of the aircraft cabin is itself more or less horizontal. Thus, in relation to the aircraft cabin, it may be considered that the plane portion 40 of the lower inner face 38 of the baggage rack 2 is more or less parallel to the floor (and/or to the ceiling) of the aircraft cabin when the baggage rack is in open position.

In order to better hold the suitcase 24 inside the baggage rack 2, it also is provided to equip the free edge of the lower inner face 38 situated on the side of the open face of the baggage rack 2 with a profiled rail 48 forming a slight projection above the plane portion 40 of the lower inner face 38 of the baggage rack 2. This profiled rail 48 thus forms a barrier for any object situated on the lower inner face 38 of the baggage rack 2. In order to avoid damaging the baggage or other objects in place in the baggage rack 2, and especially in order to avoid any injury to the passengers using the baggage rack 2, the profiled rail has a somewhat rounded form.

An embodiment of a baggage rack in which only one profiled rail would be used to hold a suitcase diagonally in the compartment without having a lower inner face having a plane portion and a raised portion is conceivable here. Of course, a rack according to the invention also possibly does not comprise a profiled restraining rail.

Such an embodiment of a baggage rack makes it possible to accommodate baggage of a larger size. In relation to a baggage rack of the state of the art, the fact of arranging in the baggage rack 2 a floor such as described above makes possible a saving on the order of 3" (or approximately 7 to 8 cm) in space occupied crosswise. It should be mentioned here that the baggage racks in an aircraft cabin, even in open position, must not hinder the movement of passengers circulating in the aisles provided for this purpose. The baggage racks therefore must not project beyond the cabin seats, above the traffic aisles.

Thanks to the space saving achieved, on the one hand through the special shape of the lower outer face of the rack and on the other hand through means making it possible to position a suitcase not down flat but diagonally in the storage compartment, it becomes possible to place a suitcase 24 of a size greater than that of a suitcase corresponding to the maximum size generally accepted by the airline companies in the aircraft cabin (usually referred to as "traveler pro") crosswise in the baggage rack 2, while in the racks of the prior art, storage for such suitcases had to be implemented longitudinally. The space saving is very appreciable. With a rack of the prior art, the space sufficing to accommodate four suitcases of traveler pro size, or even larger, in a rack according to the invention, scarcely can accommodate two suitcases of traveler pro size.

The volume 50 existing between the lower inner face 38 of the baggage rack 2 according to the invention and the suitcase 24 is not a wasted space—quite the reverse. A passenger could take advantage of this volume to store therein, in complete safety, various small-sized objects and in particular a jacket or similar item. Since this volume 50 is well defined, the objects that are placed there also are held there.

This invention is not restricted to the preferred embodiment described above by way of non-limitative example. It also relates to all the variations within the reach of the individual skilled in the trade, in the context of the claims below.

What is claimed as new and desired to be secured by Letters Patent of the United States is:

1. A baggage rack for an aircraft cabin, the rack comprising:
    a compartment having a lower outer face, an upper face, an open face arranged between the lower outer face and the upper face and allowing access to the compartment for depositing and removal of at least a baggage, and a back positioned opposite to the open face of the compartment,
    wherein said rack is pivotably mounted around an axis of pivoting and pivots around said axis between an open position in which the open face of the compartment is accessible from the aircraft cabin and in which a rear portion of the lower outer face is concealed by a wall of the aircraft cabin, and a closed position in which the open face of the compartment is inaccessible from the aircraft cabin and in which the rear portion of the lower outer face is not concealed by the wall of the aircraft cabin,
    wherein said rear portion of the lower outer face has a cylindrical form comprising generatrices substantially parallel to the axis of pivoting of the rack, and
    wherein a distance from the axis of pivoting to the generatrices continuously increases from an intersection of the lower outer face and the back of the compartment to the open face of the compartment.

2. The rack for baggage according to claim 1, wherein the distance from the axis of pivoting to the generatrices varies from one end to another end of said rear portion by a value ranging between 5 and 20 cm.

3. The rack for baggage according to claim 2, wherein said value ranges between 10 and 15 cm.

4. The rack for baggage according to claim 1, wherein the compartment comprises a lower inner face forming a floor in said compartment,
    wherein the lower inner face of the compartment includes a substantially planar portion, the lower inner face being positioned on a side of the open face,
    wherein the lower inner face of the compartment includes a raised portion positioned closer to the back than to the open face, and
    a groove, having a concavity opening toward the upper face of the compartment, is implemented between the raised portion of the lower face and the back of the compartment.

5. The rack for baggage according to claim 4, wherein a free edge of the lower inner face of the compartment situated on the side of the open face has a rim projecting from the lower inner face of the compartment toward the upper face of the compartment.

6. The rack for baggage according to claim 5, wherein the rim forms a barrier for an object situated on the lower inner face of the compartment.

7. The rack for baggage according to claim 4, wherein the groove is configured to accommodate wheels of a suitcase.

8. The rack for baggage according to claim 4, wherein a radius of curvature of the groove is 3 to 10 cm.

9. The rack for baggage according to claim 4, wherein the planar inner portion is parallel to a lower face of a ceiling of the aircraft cabin when the rack is in the open position.

10. The rack for baggage according to claim 4, wherein the planar inner portion extends over 60 to 85% of a depth of the lower inner face.

11. The rack for baggage according to claim 1, wherein the rack is configured to accommodate a traveler pro size suitcase in a crosswise direction.

12. An aircraft cabin, comprising:
at least one baggage rack, each baggage rack including a compartment having a lower outer face, an upper face, an open face arranged between the lower outer face and the upper face and allowing access to the compartment for depositing and removal of at least a baggage, and a back positioned opposite to the open face of the compartment; and
a movable flap including a pivoting strip extending under a joining portion between the rear portion of the lower outer face and the back of the compartment when the at least one baggage rack is closed,
wherein said rack is pivotably mounted around an axis of pivoting and pivots around said axis between an open position in which the open face of the compartment is accessible from the aircraft cabin and in which a rear portion of the lower outer face is concealed by a wall of the aircraft cabin, and a closed position in which the open face of the compartment is inaccessible from the aircraft cabin and in which the rear portion of the lower outer face is not concealed by the wall of the aircraft cabin,
wherein said rear portion of the lower outer face has a cylindrical form comprising generatrices substantially parallel to the axis of pivoting of the rack,
wherein a distance from the axis of pivoting to the generatrices increases from the back of the compartment toward the open face of the compartment, and
wherein the pivoting strip is pivotably mounted around a longitudinal axis substantially parallel to the axis of pivoting of the at least one baggage rack.

13. The aircraft cabin according to claim 12, wherein the movable flap has spacing shims on a side of the at least one baggage rack.

14. The aircraft cabin according to claim 13, wherein the pivoting strip is pivotably mounted around a longitudinal axis substantially parallel to the axis of pivoting of the at least one baggage rack.

15. An aircraft comprising the cabin according to claim 12.

16. A baggage rack for an aircraft cabin, the rack comprising:
a compartment having a lower outer face, an upper face, an open face arranged between the lower outer face and the upper face, and allowing access to the compartment for depositing and removal of at least a baggage, and a back positioned opposite to the open face of the compartment,
wherein said rack is pivotably mounted around an axis of pivoting and pivots around said axis between an open position in which the open face of the compartment is accessible from the aircraft cabin and in which a rear portion of the lower outer face is concealed by a wall of the aircraft cabin, and a closed position in which the open face of the compartment is inaccessible from the aircraft cabin and in which the rear portion of the lower outer face is not concealed by the wall of the aircraft cabin,
wherein said axis of pivoting is fixed relative to said compartment as said compartment pivots from said open position to said closed position,
wherein said rear portion has a cylindrical form comprising generatrices substantially parallel to the axis of pivoting of the rack, and
wherein a distance from the axis of pivoting to the generatrices continuously increases from an intersection of the lower outer face and the back of the compartment to the open face of the compartment.

17. The rack for baggage according to claim 16, wherein the distance from the axis of pivoting to the generatrices varies from one end to another end of said rear portion by a value ranging between 5 and 20 cm.

18. The rack for baggage according to claim 16, wherein the compartment comprises a lower inner face forming a floor in said compartment,
wherein the lower inner face of the compartment is substantially planar and positioned on a side of the open face,
wherein the lower inner face of the compartment includes a raised portion positioned closer to the back than the open face, and
a groove, having a concavity opening toward the upper face of the compartment, is implemented between the raised portion of the lower face and the back of the compartment.

* * * * *